2,775,632
TREATMENT OF AROMATIC HYDROCARBONS

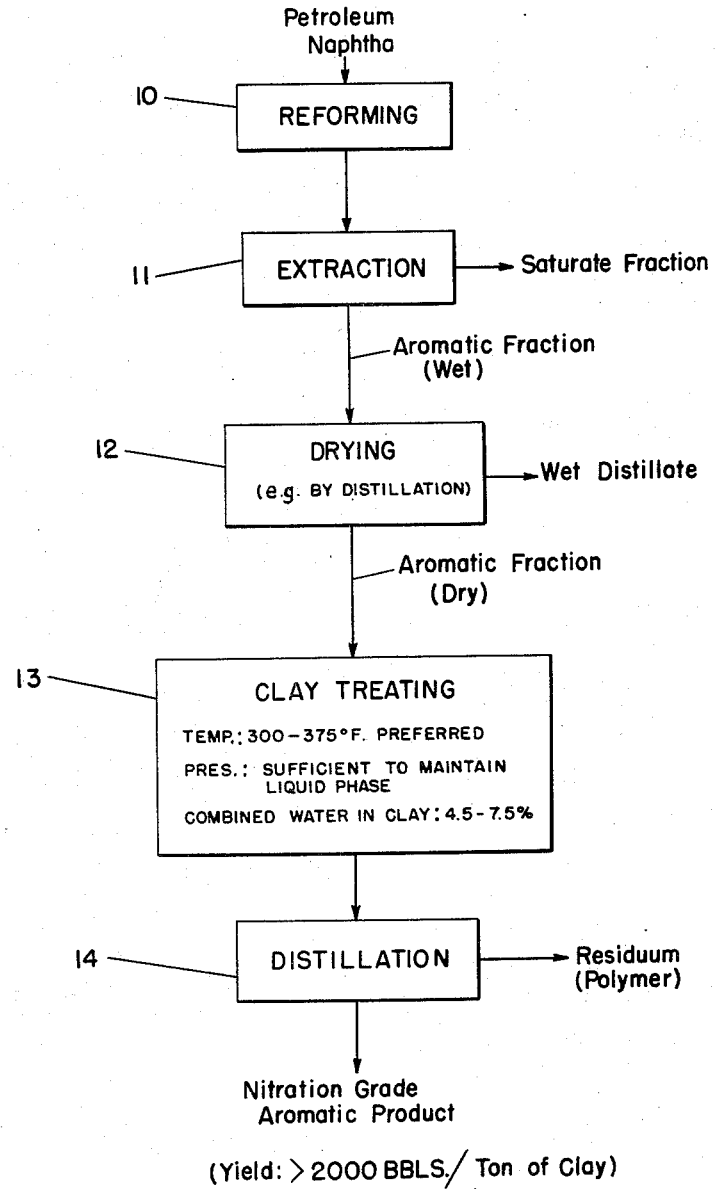

Earl M. Honeycutt, Claymont, Del., and James R. Calkins, Swarthmore, Pa., assignors to Sun Oil Company, Philadelphia, Pa., a corporation of New Jersey Application May 13, 1953, Serial No. 354,742

4 Claims. (Cl. 260—674)

This invention relates to the purification of aromatic hydrocarbons and more particularly to the preparation of nitration grade aromatic products. The invention is especially concerned with the manufacture of products of nitration grade from aromatic stocks derived from petroleum and which fail to conform to nitration grade specifications due to poor acid wash color.

Aromatics such as benzene, toluene, xylenes, etc. have been produced from petroleum by various procedures including thermal and catalytic reaction steps in combination with suitable procedures for separating and concentrating the aromatic from non-aromatic products. A procedure now used extensively comprises reforming of petroleum naphthas to convert non-aromatic to aromatic hydrocarbons, followed by selective extraction of the aromatics by means of a suitable solvent such as diethylene glycol.

Aromatics produced from petroleum by procedures involving a thermal or catalytic reaction generally fail to meet nitration grade specifications even though the aromatics have been concentrated to a high state of purity such as 98% or better. Such products usually fail to meet these specifications due to poor acid wash color, which can be attributed to the presence of small amounts of olefinic constituents that react with and darken the acid employed in the standard acid wash color test (ASTM Method D 848–47).

In order to improve the acid wash color of aromatic hydrocarbons, treatment at elevated temperature with ordinary adsorptive clay, such as is available commercially under such trade names as Attapulgus clay, Floridin, Milwhite and Filtrol, has been employed. Contact of the hot aromatic stock with clay causes the olefinic constituents to polymerize, and the polymers can then be separated from the treated aromatic by distillation. The clay heretofore used for this purpose has been the usual commercial material, which has a combined moisture content generally of about 10% by weight.

The present invention is directed to an improvement in the clay treatment of aromatic stocks for the purpose of improving the acid wash color. It has now been found that in treating the aromatic stock in liquid phase with clay at elevated temperature, a very substantial increase in the yield of product meeting nitration grade specifications per ton of clay can be effected by using clay which has a combined water content within the range of 4.5–7.5% by weight. For example, when ordinary commercial clay having about 10% combined water is employed, typical yields of nitration grade product are 1000–1500 bbls./ton of clay; whereas when the combined water content is reduced to within the range specified, yields of the order of 3500 bbls./ton of clay are obtainable.

The invention thus comprises treating an aromatic stock, which initially possesses unsatisfactory acid wash color, in liquid phase and at sufficiently elevated temperature with adsorptive clay having a combined water content within the range of 4.5–7.5% by weight. The temperature should be above 275° F. but below the critical temperature of the aromatic stock, and preferably is maintained within the range of 300–375° F. Sufficient pressure is used to keep the aromatic charge in liquid phase. Contact of the aromatic stock with the clay at the elevated temperature employed causes olefinic constituents to polymerize to form higher boiling materials which can then be separated from the treated aromatic by distillation. A yield of nitration grade product in excess of 2000 bbls./ton of clay can readily be obtained in this manner.

For practice of the invention to obtain the best yield of nitration grade product, other factors which are important are the free water content of the clay, as distinguished from its combined water content, and the water content of the aromatic stock. The clay when initially contacted with the stock should have a low free water content, e. g. less than 0.5% by weight, and preferably should contain essentially no free water. The presence of free water tends to reduce the effectiveness of the clay in polymerizing the undesirable olefinic constituents of the charge. It has also been found that the water content of the aromatic stock to be treated should be below 200 p. p. m. and preferably should be as low as is practical, since the presence of water in the charge tends to cause accumulation of free water in the clay under the conditions of pressure and temperature employed in the operation. Aromatic stocks prepared by the widely used procedure involving reforming, extraction with diethylene glycol and water washing will contain an excessive amount of water (e. g. about 800 p. p. m.) due to the high solubility of water in aromatic hydrocarbons; and such stocks therefore require dehydration before treatment with clay in accordance with the present invention.

The accompanying drawing, which is a schematic illustration of an embodiment of the invention, shows the several steps employed in preparing nitration grade aromatic product from a petroleum naphtha stock. The naphtha is fed to a reforming step 10 wherein conditions are maintained suitable for converting naphthenic constituents of the charge into aromatic hydrocarbons. The naphtha charge may be a fraction of relatively narrow boiling range adapted for the production of an individual aromatic hydrocarbon or may be a wide boiling range fraction from which various aromatic hydrocarbons such as benzene, toluene, xylenes, etc., are to be produced. Suitable conditions for reforming petroleum stocks to produce aromatics are well known in the art, and this step may comprise any known or suitable reforming procedures.

Reaction product from the reforming step 10 is composed of the desired aromatic hydrocarbon in admixture with hydrocarbons from which the desired aromatic must be separated by a suitable concentrating procedure. Such procedure may include distillation and/or extraction, and it is illustrated in the drawing as extraction step 11. This step may comprise extraction of the reformate product, or a fraction thereof obtained by distillation, with a suitable solvent selective for the aromatic component, for example, with diethylene glycol containing a minor amount of water. The aromatic extract is recovered from the solvent by distillation and is normally water washed to remove traces of solvent. This results in an aromatic fraction which is relatively wet due to the fact that the solubility of water in aromatic hydrocarbons is substantial.

The wet aromatic fraction obtained from step 11 must be subjected to a drying step 12 before treatment with clay in accordance with the present invention. Any known or suitable drying procedure capable of reducing the water content below 200 p. p. m. may be used for this purpose. A particularly suitable procedure for commercial practice involves distillation of a minor portion of the aromatic fraction, whereby the water concentrates in the distillate. For example, if 5% of the wet aromatic fraction is distilled, most of the water will pass overhead with the aromatic distillate and, after condensation, will separate therefrom as a water layer. The wet aromatic layer may, if desired, be recycled back to the drying step. This procedure will yield an aromatic fraction of low water content suitable for treatment in the next step of the operation.

The next step, illustrated in the drawing by numeral 13, is the treating step in which the dried aromatic stock in liquid form is brought into contact at elevated temperature with adsorptive clay having a combined water content of 4.5–7.5%. For this purpose the clay can be prepared by roasting conventional commercial clay of higher moisture content at a temperature of, for example, about 1000° F. until the combined water content is reduced to within the desired range of 4.5–7.5% and preferably to 5.8–6.5%. The specified range of combined water content of the clay is critical for obtaining the desired improvement according to the invention. The temperature of treatment in step 13 should be above 275° F., preferably 300–375° F., with the pressure being sufficient to maintain the aromatic stock in liquid form, and the manner of conducting the operation preferably is by filteration of the liquid through a bed of the clay although other contacting procedures are also operative. With the clay having a combined water content as specified and substantially no free water initially, the amount of stock which can be treated with a given batch of clay to yield nitration grade product will be in excess of 2000 bbls. per ton of clay. Eventually the clay will lose its activity, probably due to accumulation of polymers therein, and will have to be replaced by fresh clay or regenerated before further use. The high yield of product obtained according to the invention, however, will minimize the cost of replacement or regeneration of the clay.

The effluent from the clay treating step 13 generally has an acid wash color substantially improved over that of the aromatic charge but contains some polymeric materials which preferably should be removed to improve acid wash color still further. This may be done by means of distillation step 14. In this step the treated aromatic is distilled overhead leaving the undesirable polymeric material as residuum. The yield of distillate meeting nitration grade specifications will be in excess of 2000 bbls. per ton of the clay used in step 13 and yields of the order of 3000–3500 bbls./ton can readily be obtained. As a general rule, the acid wash color of the distillate product will remain more or less constant at a satisfactorily low value until a certain yield in excess of 2000 bbls./ton is reached, after which the acid wash color will sharply increase to an unsatisfactorily high value. When this occurs, the clay should be replaced with fresh or regenerated clay of the proper water content.

The following examples, in which precentages are by weight unless otherwise specified, illustrate the improvement obtained according to the invention and show the importance of water content.

*Example I*

A commercial clay, designated as 30/60 mesh Attapulgus Grade AA and which had been roasted to a free water content of 0.4% and a combined water content of 10.1%, was used for treating a stock of petroleum benzene obtained from a reforming operation. The charge stock contained about 98% benzene and met nitration grade specifications except for the acid wash color which was 4—. Nitration grade specifications require an acid wash color not darker than No. 2 color standard and it is desirable that such color be not greater than No. 1. The charge was first dried by filtration through silica gel and then was filtered under pressure and at a temperature of about 300° F. through a column packed with the clay. A space rate of 5.8 liquid volumes per bulk volume of clay per hour was maintained. Samples of the filtrate were collected and tested for acid wash color both before and after distillation. The effluent up to a yield of about 1000 bbls./ton had acid wash colors before and after distillation of about 1 and 0+, respectively. Thereafter, the acid wash color increased rapidly so that the filtrate, even after distillation, no longer met the acid wash color specification for nitration grade benzene when the yield exceeded about 1500 bbls./ton.

*Example II*

Another batch of the benzene specified in Example I and dried by means of silica gel was treated in essentially the same manner with the same type of clay as in that example, but in this case the clay had been roasted until it contained 6.1% combined water and no free water. At a yield of 2000 bbls./ton the acid wash colors for the filtrate before and after distillation were 1 and 0+, respectively; and at a yield of 3000 bbls./ton the colors had increased only slightly to about 1+ and 1—, respectively. Nitration grade specifications were met until a yield of about 3500 bbls./ton was reached, at which time the colors for both the undistilled and distilled product increased sharply to about 3.

*Example III*

Another run was made as in the preceding example, but in this case the clay had been roasted to a combined water content of 4.0% and no free water. It was found that the yield of nitration grade product was zero. Even the initial filtrate after distillation had about the same acid wash color as the charge benzene. This illustrates the importance of maintaining the combined water content of the clay within the specified range.

*Example IV*

The aromatic stock in this case was another commercial benzene prepared by reforming a petroleum naphtha, extracting the reformate with diethylene glycol and water washing. The stock contained of the order of 800 p. p. m. of water and had an acid wash color of 12. One portion of the stock was clay treated without drying, while another portion was first subjected to a drying step by distilling 5 vol. % overhead so that its water content was reduced to 162 p. p. m. Each portion was filtered as a liquid at 300° F. and at a space rate of 1.0 through 30/60 AA Attapulgus clay which had been roasted to a combined water content of 6.0% and no free water. The yield of distilled filtrate having acid wash color not darker than No. 1 was only 980 bbls./ton of clay with the undried stock, whereas the stock dried to 162 p. p. m. showed a distilled filtrate yield in excess of 3000 bbls./ton. This illustrates the importance of having the water content of the aromatic charge below 200 p. p. m.

*Example V*

A blend composed of, by volume, 47.5% reformer benzene having an acid wash color of 4, 47.5% reformer toluene having an acid wash color of 5+ and 5% n-butane was used as the aromatic charge stock. Its water content was less than 75 p. p. m. The clay used was 30/60 AA Attapulgus having no free water and a combined water content of 6.0%. Treatment of the charge stock was effected at a temperature of 300° F., a pressure of 300 p. s. i. g. and a space rate varying from 3.4 to 5.8. The effluent from the clay treater was stripped of butane and distilled to obtain a polymer-free mixture of benzene and toluene. At a yield of 2200 bbls./ton the mixed benzene and toluene product had an acid wash color less than 1. Thereafter, the operation was continued by filtering toluene alone through the clay. The acid wash color of the distilled filtrate remained less than 1 until a total aromatic yield of 2800 bbls./ton was exceeded, whereupon the color increased sharply to above 3.

While the foregoing examples are specific to the treatment of stocks containing $C_6$-$C_7$ aromatic hydrocarbon, it will be understood that the invention is applicable to the preparation of nitration grade products from higher boiling aromatics.

We claim:

1. In a process of making nitration grade aromatic hydrocarbon which comprises reforming a petroleum naphtha, extracting the reformate with a water soluble solvent to yield an aromatic rich hydrocarbon fraction containing a minor amount of said solvent, and water washing said aromatic rich fraction to remove said solvent, the steps which comprise removing water from the water washed aromatic fraction to yield an aromatic stock having a water content less than 200 p. p. m., treating said stock in liquid phase at a temperature between 275° F. and its critical temperature with adsorptive clay having a combined water content between 4.5% and 7.5% by weight, and recovering from the treated material nitration grade aromatic product in a yield exceeding 2000 barrels per ton of clay.

2. Process according to claim 1 wherein said aromatic stock is $C_6$-$C_7$ aromatic hydrocarbon and the combined water content of the clay is 5.8–6.5% by weight.

3. In a process of making nitration grade aromatic hydrocarbon which comprises reforming a petroleum naphtha and extracting the reformate in the presence of water, the steps which comprise obtaining from said reformate an aromatic rich hydrocarbon fraction having a water content less than 200 p. p. m., treating said fraction in liquid phase at a temperature between 275° F. and its critical temperature with adsorptive clay having a combined water content between 4.5% and 7.5% by weight, and recovering from the treated material nitration grade aromatic product in a yield exceeding 2000 barrels per ton of clay.

4. Process according to claim 3 wherein said aromatic rich hydrocarbon fraction is $C_6$-$C_7$ aromatic hydrocarbon and the combined water content of the clay is 5.8–6.5% by weight.

References Cited in the file of this patent

UNITED STATES PATENTS

| | | |
|---|---|---|
| 2,232,761 | Balthis | Feb. 25, 1941 |
| 2,366,570 | Souders et al. | Jan. 2, 1945 |
| 2,400,355 | Jones et al. | May 14, 1946 |
| 2,400,802 | Arnold | May 21, 1946 |
| 2,664,202 | Bartleson | Dec. 29, 1953 |
| 2,713,552 | Lien et al. | July 19, 1955 |

OTHER REFERENCES

The Science of Petroleum, Oxford University Press (1938), vol. III, edited by Dunstan et al., pp. 1680 and 1704.